June 11, 1929.  B. W. FREEMAN  1,716,954
POWER DRIVE FOR SLIDES
Filed Sept. 15, 1924  2 Sheets-Sheet 1
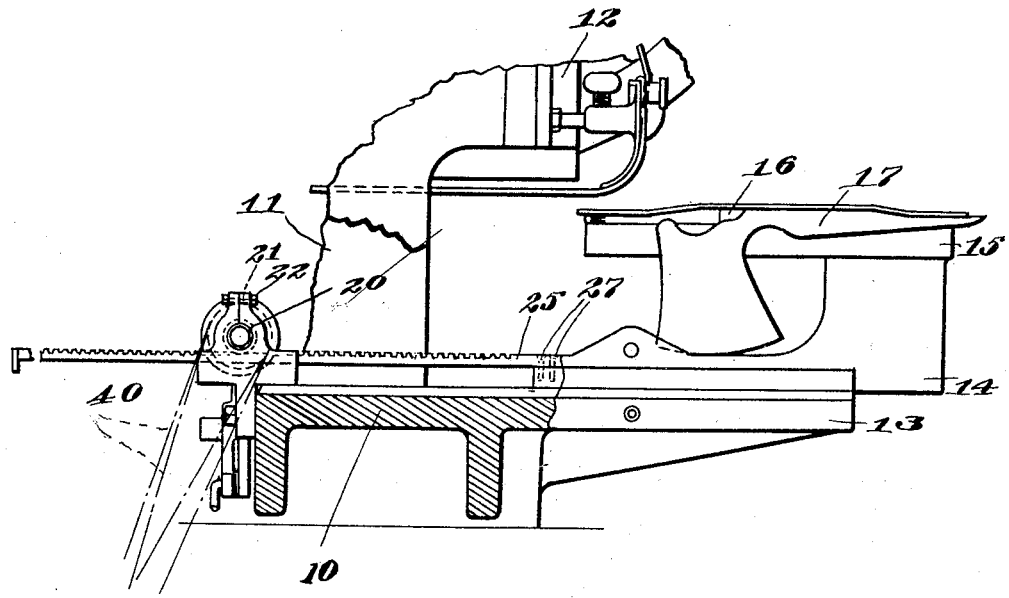
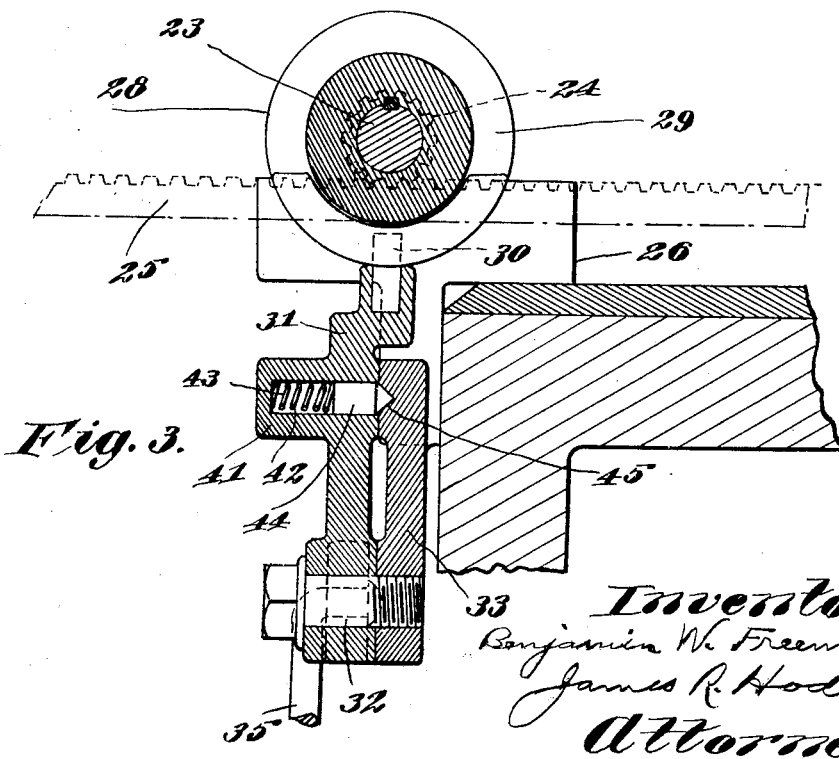

June 11, 1929.  B. W. FREEMAN  1,716,954
POWER DRIVE FOR SLIDES
Filed Sept. 15, 1924    2 Sheets-Sheet 2
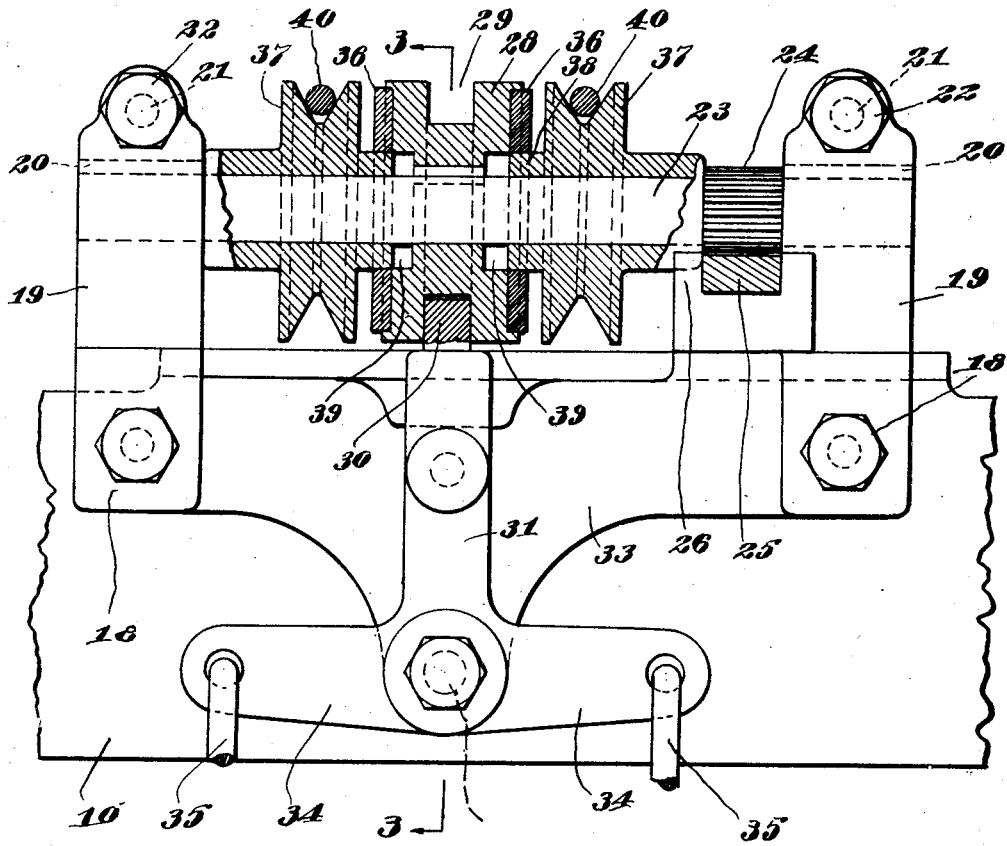
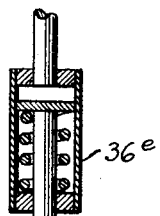
Fig. 2.
Fig. 4.
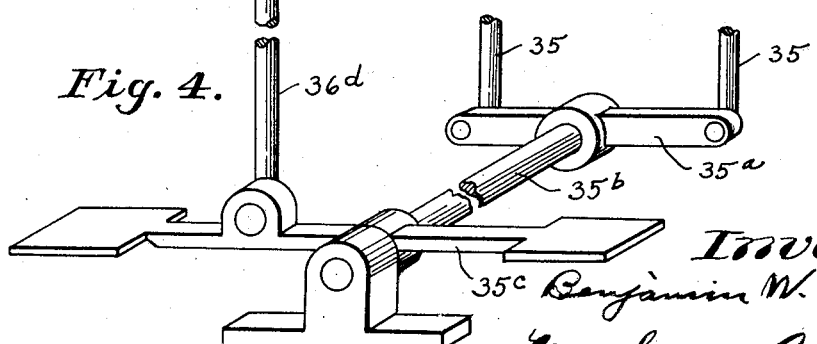
Inventor
Benjamin W. Freeman
By James R. Hodder
Attorney Patented June 11, 1929.

1,716,954

UNITED STATES PATENT OFFICE.

BENJAMIN W. FREEMAN, OF CINCINNATI, OHIO.

POWER DRIVE FOR SLIDES.

Application filed September 15, 1924. Serial No. 737,770.

My present invention relates to cut out presses, and more particularly to an improved power drive for working the die or anvil slide into and out of position with respect to the plunger of the press.

In presses, and particularly in cut out presses employed in cutting out patterns in shoe uppers, the die and supporting means are moved into and out of position with respect to the plunger of the press, once for each operation. This is necessary in order that the upper operated on may be removed from the die and a new upper on which the operation is to be performed may be inserted in position on such die. The dies, together with their supporting elements, are relatively heavy and require a great deal of strength on the part of the operator and as the operation must be performed many hundreds of times during the working day, the work is extremely fatiguing. It has been found that, in order to keep up the production, it is necessary to relieve the operators at relatively short intervals as the falling off in production is particularly noticeable when the operator becomes tired.

With a view to obviating the necessity for so much manual labor in connection with this class of work, I have devised the subject matter of the present invention which consists essentially in a new and improved form of power drive for dies and their supporting structures which may be operated to mechanically move the die with the supporting structure into working position in alinement with the plunger of a press or out of alinement and into such position as will bring the die and the work carried thereby into position where the operator may perform the necessary operations thereon or in connection therewith. The use of power drive improves the quality of the work done, particularly as to accuracy in cutting and gauging. Further, the interest of the operators in their work is kept up because they are not now constantly thinking of the work involved in pushing the die or carrier into and out of position beneath the plunger of the cut out press. Relieved of this worry, it is found that they remain alert and pay attention to their work for a longer time than heretofore.

In practicing this invention I provide a pair of constantly rotating pulleys, each of the pulleys operating in the reverse direction with respect to the other and associated with such pulleys are clutch members which may be brought laterally into engaging position to rotate a shaft having means for moving the member attached to the die supporting structure.

For a more complete disclosure of the machine to which this invention is adapted, reference may be made to my prior Patent No. 1,681,033, granted August 14th, 1928, and of which the present invention represents an improvement. In this machine it will be noted that a reciprocable plunger is actuated through a clutch connection to a power driving shaft for movement toward and from the die anvil slide.

The object of my invention, therefore, is an improved power drive for mechanically moving a die into and out of alinement with the plunger of a power press.

In the accompanying drawings,

Fig. 1 illustrates a portion of a power press to which my invention has been applied, only so much of the power press being shown as is necessary for a clear understanding of the invention;

Fig. 2 is a rear elevation of my device; and

Fig. 3 is a vertical sectional side elevation on the line 3—3 of Fig. 1.

Figure 4 is a diagrammatic showing of one form of operating mechanism for the machine.

Referring to the drawings, 10 designates a base on which is mounted a framework 11. In the framework 11 is mounted for vertical reciprocating movement a plunger 12. The base extends forwardly or to the right, as viewed in Fig. 1, such forwardly extending portion being designated by the numeral 13, and being provided with guideways in which is slidably mounted an anvil slide 14 to the upper end of which is adjustably secured in any desired manner an anvil 15 to the top surface of which is secured a die structure 16 of any desired shape or form. There is shown associated with the die structure 16 and die anvil 15 a shoe upper 17 in position to be operated on so as to have cut out therefrom the pattern fashioned in the die structure 16. It will be noted that the anvil is so constructed as to protect all parts of the upper that are not being cut, as more fully disclosed in my patent above mentioned. Ordinarily the anvil slide 14, die anvil 15, and die 16 are moved as a unit by the operator who, after placing the upper 17 in position on the die structure 16 while the elements referred to are in the position shown in Fig. 1 on the forwardly extending portion 13 of the base 10, moves the same rearwardly of the frame member 11 or to the right, as viewed in Fig. 1, so as to position the die structure under the plunger 12 of the press. As stated above, the weight of the elements, 14, 15 and 16 is relatively great, and as such elements must be sturdily constructed to stand up under the work, considerable energy is, therefore, required to move the members 14, 15, and 16 rearward and forward in the guideways formed in the base 10 and forwardly extending portion 13 thereof.

To obviate the necessity of this manual labor I have secured to the rear portion of the base 10 and at each side thereof by bolts 18 bearing brackets 19 and in these bearing brackets 19 are formed split bearings 20, such split bearings being adjustable by means of the bolts and nuts 21 and 22 respectively. Rotatably mounted in the bearings 20 is the shaft 23 having secured to, or formed integral therewith, adjacent one end, a pinion 24 which meshes with, and drives, a rack bar 25 slidably mounted in a guideway 26 formed on the base 10. The forward end of the rack bar 25 is secured to the rearward end of the anvil slide 14 by rivets 27 or in any other suitable or desirable manner. On the shaft 23 is a member 28, which member is capable of sliding movement longitudinally of the shaft, but is rotatable with said shaft. This member 28 is provided with an annular groove 29 in the lower part of which is closely mounted a clutch pin 30 secured to the top of a member 31 that is pivotally mounted on a stud 32 screwed into a plate 33 extending between the bearing members 19. Formed integral with, and extending laterally outward from, each side of the pivot point of the member 31 are arms 34 of any desired length and pivotally mounted to the ends of such arms are operating rods 35 which extend downwardly to suitable treadles (not shown) adapted to be controlled by the operator.

Formed on each face of the member 28 are circular recesses in which are secured annular plates 36 of fibre, cork, or other suitable material which are adapted to engage with the inner faces of V-grooved pulleys 37 rotatably mounted on the shaft 23 on either side of the member 28. The V-grooved pulleys 37 are provided on their inner faces with hubs 38 which extend into circular recesses 39 in the member 28. Over the pulleys 37 run belts 40, one of the belts running in such a direction as to rotate its associated pulley in a clockwise direction, as viewed in Fig. 1, and the other belt moving in such a direction over its associated pulley 37 as to rotate such pulley in an anti-clockwise direction, as viewed in Fig. 1. It will thus be seen that, if the elements above described are in the position shown in Fig. 2, the shaft 23 and member 28 will remain stationary and one of the pulleys, as the right hand pulley 37, rotates in a clockwise direction, while the other pulley 37 rotates in an anti-clockwise direction.

If, now, the right hand rod 35, as viewed in Fig. 2, is pulled downwardly, the upper end of the arm 31 carrying the pin 30 engaged in the groove 29 of the member 28 will be moved to the right, sliding the member 28 along the shaft 23 and bringing the circular member 36 of fibre, cork, or other suitable material into engagement with the adjacent face of the right hand pulley 37. The power transmitted to the V-grooved pulley 37 by the belt 40 will be transmitted to the member and therefore to the shaft 23, which, as in the case assumed, will rotate in a clockwise direction, thus rotating the pinion 24 which, meshing with the rack bar 25, will move the rack bar to the rear of the press or to the left, as shown in Figs. 1 and 3, thus bringing the members 14, 15 and die 16 to the rear of the press and into position in the line of movement of the plunger 12 of such press. When the members 14, 15 and die 16 have reached their rearmost position, the operator will release the treadle (not shown) to allow upward movement of the rod 35 which it will do because of the balancing of the treadle members. In order to prevent the arm 31 from swinging into the reverse position, I have arranged intermediate such arm an enlargement 41 drilled, as indicated at 42, to receive a coil spring 43 and slidably mounted in the drilled portion 42 exterior of the spring 43 is a pointed plunger 44 which engages in the V-shaped depression 45 formed in the plate 33 that extends between the bearing members 19. The pull on the rod 35 is sufficient to cause the pointed end of the member 44 to ride out of the V-shaped depression 45, but the spring 43 is of sufficient tension to maintain the plunger 44 in engagement with the V-shaped depression 45 under ordinary conditions. After the operation has been performed on the upper 17, the operator, by operating the treadle mechanism, pulls down on the left hand rod 35, as viewed in Fig. 2, swinging the upper end of the arm 31 to the left, as viewed in Fig. 2, throwing the left hand circular plate 36 of fibre, cork, or other suitable material into engagement with the adjacent face of the V-grooved pulley 37, thereby causing a rotary movement of the shaft 23 in an anti-clockwise direction which, by means of the pinion 24 engaging with the rack bar 25, causes a right hand movement of such rack bar as viewed in Figs. 1 and 3, thus forcing the members 14, 15 and 16 to the right, as viewed in such figures.

When it is desired to operate the anvil slide in synchronism with the reciprocating movement of the cut-out press plunger, it will be obvious that any suitable linkage may be utilized to connect the two. As disclosed in my prior patent, above mentioned, the plunger is actuated by a clutch which connects the plunger to the power driving shaft and this clutch is brought into operation upon actuation by the operator of a foot treadle. Consequently, any linkage connecting the operating rods 35, which are connected to a suitable treadle, with the mechanism for throwing the plunger operating clutch into and out of engagement with the power driving shaft, will be readily adapted to cause a movement of the several clutches in synchronism and thereby accomplish a synchronized movement between the plunger and the anvil. In Figure 4 I have shown a simple type of inter-connecting linkage which will cause proper synchronism of the reciprocating slide and plunger. I have shown the rods 35 connected to a rocker arm 35ª which is fixedly mounted on a shaft 35ᵇ. A double acting treadle 35ᶜ is also mounted fixedly on the shaft 35ᵇ, so that the operator may press down on one end of the treadle to cause the work slide to move into operating position, and on the other to cause it to recede to work placing position. By connecting the treadle rod 36ᵈ, which in the patent referred to is numbered 46, with a spring connection 36ᵉ when the treadle to the left, as illustrated, is depressed the slide is advanced by the rack and gear mechanism to operating position. As the slide reaches operating position the stop plate will cause the release of the latch, and the treadle arm, being under spring tension, will cause the plunger clutch to engage, thereby depressing the plunger for one stroke. At the same time that one of the rods 35 causes the work slide to move, the depressing of the foot treadle to the left pulls down on the rod 36ᵈ causing the spring connection 36E to be tensioned. By reference to the Freeman Patent No. 1,681,033, and particularly to the descriptive matter on page 4, line 126 through page 6 line 88 and the detail drawing of Fig. 7 of that patent, it will be noted that the tensioning of the spring connection 36E of the rod 36D will not cause any movement of the lever referred to in this patent as the member 45. As soon as the slide reaches operating position the clutch safety releasing mechanism is actuated and then the already tensioned rod 36D causes a single operation of the presser member.

While I have described my invention in connection with a cut out press applicable for cutting out patterns from a shoe upper, it is to be understood that my invention is not to be thus limited, but is applicable for use in any situation where it is desired to move work or tool holding block into and out of position in a press or other machine tool. I am not, therefore, to be limited to the exact details of construction shown nor the manner in which the invention is to be employed other than as pointed out in the appended claims.

My invention is further described and defined in the form of claims as follows:

1. In a power drive for work holders and the like, the combination of a work support, a rack bar secured to one end thereof, a pinion meshing with said rack bar, a rotatably mounted shaft on which said pinion is mounted, a pair of pulleys rotatably mounted on said shaft, means for driving said pulleys in opposite directions, a clutch member adapted to be moved into engagement with either pulley for rotating said shaft in either direction to cause a reciprocating movement of the rack bar and work support, and means for moving said clutch at will.

2. In a power drive for work holders and the like, the combination of a work support, a rack bar attached to said work support, a pinion associated with said rack bar, a shaft on which said pinion is mounted, a pair of pulleys rotatably mounted on said shaft and spaced apart from each other, means for driving such pulleys in opposite directions, a clutch member rotatably and slidably mounted on said shaft, means for moving said clutch into engagement with either of the pulleys, and means for maintaining the clutch member in neutral position with respect to said pulleys under normal conditions.

3. A cut out machine for operating upon boot and shoe uppers, having work supporting means constructed to support a portion of an upper to be cut, and cutting means comprising component members, one of said members being movable with said work supporting means, power actuated means for moving said support to a position of rest where the work may be positioned on said support so as to be properly aligned with one of said component members, said power actuated means being further adapted to move said support to a different position of rest where said cutting means are actuated.

4. A cut out machine for operating upon boot and shoe uppers, having work supporting means constructed to support a portion of an upper to be cut, and cutting means comprising component members, one of said members being movable with said work supporting means, power actuated means for moving said support to a position where the work may be positioned on said support so as to be properly aligned with one of said component members, said power actuated means being further adapted to move said support to a different position where said cutting means are actuated.

5. A cut out machine for operating upon boot and shoe uppers, having work supporting means constructed to support a portion of an upper to be cut, and cutting means comprising component members, one of said members being movable with said work supporting means, a power actuated means associated with said support for moving the same to a position of rest, where work may be positioned on said support in proper alignment with one of said component members and to a position where said cutting means are actuated.

6. A cut out machine for operating upon boot and shoe uppers, having work supporting means constructed to support a portion of an upper to be cut, and cutting means comprising component members, one of said members being movable with said work supporting means, a plunger associated with the work support, a power actuated means associated with said support for moving the same to a position of rest, where work may be positioned on said support in proper alignment with one of said component members and to a position where said cutting means are actuated.

7. A cut out machine for operating upon boot and shoe uppers, having cutting means and movable work supporting means constructed to support a portion of an upper to be cut and to protect a portion of said upper not to be cut, power actuated means for moving said support to a position of rest where the work may be positioned on said support so as to be properly aligned with said cutting means, said power actuated means being further adapted to move said support to a different position of rest where said cutting means are actuated.

8. In a cut out machine for shoe uppers having a work support provided with ornamenting instrumentalities, power actuated means for moving said support to a position of rest where the work may be positioned on said support so as to be properly aligned with said ornamenting instrumentalities, and a clutch for connecting said means to said support, a second clutch adapted to connect said power actuating means to said support whereby to move said support to a different position of rest where said ornamenting instrumentalities are actuated.

9. In a cut out machine for shoe uppers having a work support provided with ornamenting instrumentalities, power actuated means for moving said support to a position where the work may be positioned on said support so as to be properly aligned with said ornamenting instrumentalities, and a clutch for connecting said means to said support, a second clutch adapted to connect said power actuated means to said support whereby to move said support to a different position where said ornamenting instrumentalities are actuated.

10. In a cut out machine for shoe uppers, the combination of a work support, ornamenting instrumentalities carried thereby, a power actuated means associated with a support for moving said support to a position of rest, where work may be positioned on said support in proper alignment with said ornamenting instrumentalities and to a position where said ornamenting instrumentalities are actuated, means to clutch said power actuated means to said support for moving the same to the work aligning position, and means to clutch said power actuated means to said support for moving the same to the ornamenting position.

11. In a cut out machine for shoe uppers, the combination of a work support, ornamenting instrumentalities carried thereby, a plunger associated with the work support, a power actuated means associated with a support for moving said support to a position of rest where work may be positioned on said support in proper alignment with said ornamenting instrumentalities, a clutch for connecting said means to said support thereby to move the support to the work aligning position, and a second clutch adapted to connect said power means to said support for moving the support to a position where said ornamenting instrumentalities are actuated.

12. In a cut out machine for shoe uppers, the combination of a work support, ornamenting instrumentalities carried thereby, a plunger associated with the work support, a power actuated means associated with the support for moving said support to a position of rest where work may be positioned on said support in proper alignment with said ornamenting instrumentalities, a clutch for connecting said means to said support thereby to move the support to the work aligning position, and a second clutch adapted to connect said power means to said support for moving the support to a position where said ornamenting instrumentalities are actuated, and means for operating the plunger and the support in synchronism.

13. In a device of the character described, the combination of a reciprocating plunger, a work support movable into and out of position with respect to the plunger, ornamenting instrumentalities carried by said work support for co-action with said plunger in ornamenting the work, and means for operating the plunger and the work support in synchronism.

14. In a device of the character described, the combination of a reciprocating plunger, a work support movable into and out of the path of movement of the plunger, ornamenting instrumentalities carried by said work support and adapted to co-act with the plunger in ornamenting the work, connections between the plunger and the work support, and means for operating the connections to cause a movement of the work support in synchronism with the reciprocating movement of the plunger.

15. In a device of the character described, the combination of a reciprocating plunger, a work holder movable into and out of the path of movement of the plunger, a power actuated means for operating the plunger, and for moving the work support, means to clutch said plunger to said power means, means to clutch said work holder to said power means, connections between the plunger and the work holder, and means for operating the connections to cause a movement of the work holder in synchronism with the reciprocating movement of the plunger.

16. In a power drive for work holders, and the like, the combination of a rotatably mounted shaft, means associated therewith for rotating said shaft in either direction at will, a pinion secured to said shaft, a rack bar engaging with said pinion, and a work holder connected to said rack bar, and means to clutch said shaft rotating means to the shaft for rotating same in one direction thereby to move said rack bar and said work holder, and means to clutch said shaft rotating means to said shaft, to rotate the same in the opposite direction thereby to move said rack bar and said work holder in an opposite direction.

In testimony whereof, I have signed my name to this specification.

BENJ. W. FREEMAN.